United States Patent [19]
Lawman

[11] Patent Number: 5,928,338
[45] Date of Patent: Jul. 27, 1999

[54] METHOD FOR PROVIDING TEMPORARY REGISTERS IN A LOCAL BUS DEVICE BY REUSING CONFIGURATION BITS OTHERWISE UNUSED AFTER SYSTEM RESET

[75] Inventor: Gary R. Lawman, San Jose, Calif.

[73] Assignee: Xilinx, Inc., San Jose, Calif.

[21] Appl. No.: 08/879,537

[22] Filed: Jun. 20, 1997

[51] Int. Cl.[6] ............................. G06F 13/36; G06F 12/02
[52] U.S. Cl. ................... 710/8; 710/10; 710/104; 713/100
[58] Field of Search ................... 395/828, 653, 395/284; 711/170; 710/8, 10, 104; 713/100

[56] References Cited

U.S. PATENT DOCUMENTS

| | | | |
|---|---|---|---|
| 4,771,405 | 9/1988 | Burch et al. | 365/189 |
| 5,187,792 | 2/1993 | Dayan et al. | 395/725 |
| 5,253,355 | 10/1993 | Grieff | 395/425 |
| 5,748,922 | 5/1998 | Smith et al. | 395/309 |
| 5,815,734 | 9/1998 | Lee et al. | 395/880 |

OTHER PUBLICATIONS

Andrew S. Tanenbaum, "Structured Computer Organization," Third Edition, 1990, Prentice–Hall International, Inc., Chapter 6, pp. 324–327.

Primary Examiner—Thomas C. Lee
Assistant Examiner—Albert Wang
Attorney, Agent, or Firm—Lois D. Cartier

[57] ABSTRACT

In PCI devices, there are bits specified as read-only for use in configuring a system upon reset that could also be used after configuration for reading and writing. The present invention allows the use of such bit locations for other arbitrary user-defined purposes such as a mailbox register without interfering with the normal PCI local bus operation or configuration and with zero or minimum additional decode circuitry. Such user-defined registers can provide flag or mailbox type storage for various applications, and may be accessed by a configuration read/write cycle from otherwise normal memory or I/O based applications. Thus, the present invention, in effect, comprises a method for exploiting an otherwise unused storage resource in PCI or other local bus compatible devices.

21 Claims, 1 Drawing Sheet

METHOD FOR PROVIDING TEMPORARY REGISTERS IN A LOCAL BUS DEVICE BY REUSING CONFIGURATION BITS OTHERWISE UNUSED AFTER SYSTEM RESET

FIELD OF THE INVENTION

The present invention relates generally to the field of computer system architectures, and more specifically to a method of using redundant bit locations in a PCI or other local bus device to provide general purpose or user-defined registers.

BACKGROUND OF THE INVENTION

PCI is an open, non-proprietary local bus standard offering high performance for multiple peripheral devices. The standard is becoming widely accepted throughout the computer industry. A complete PCI Revision 2.1 specification is available from PCI Special Interest Group, P.O. Box 14070, Portland, Oreg. 97214, the information of which is incorporated herein by reference. PCI works as a processor-independent bridge between a CPU and high-speed peripherals and allows PCI cards built today to be used in many different systems. The PCI standard specifies a configuration address space which is designed to accommodate many different types of computer systems, including desk-top, portable, and server computers. The PCI standard allows servers to offer more I/O connections, expansion slots, and the isolation of high bandwidth traffic from lower bandwidth traffic. The ability to identify each PCI device and dynamically assign system resources to the PCI devices enables configuration software to construct optimized system memory and I/O address space maps that remain free of resource conflicts.

To meet the requirements of these various architectures, the architects of the PCI configuration address space implemented a template as part of the PCI standard. This template consists of a block of 256-byte-wide contiguous addresses into which all of the PCI configuration space registers are mapped. 64 bytes are used for a header called a Configuration Space Header, which comprises configuration space registers. 192 bytes are used for device dependent regions.

FIG. 1 is a pictorial view of the 64 byte register layout of a Type 00h PCI Configuration Space Header (PCI Rev. 2.1). All PCI Rev 2.1 compliant devices that implement a Type 00h header must support this layout. Of this 64-byte configuration space header region, the first 16 bytes are assigned to the PCI Device Independent Region, and the remaining 48 bytes are assigned to the PCI Device Header Type Region. This register set controls how a PCI device's memory and I/O functions are mapped into a system's memory and I/O address spaces when the system is reset.

Several configuration space registers within the PCI Device Header Type Region, called "Base Address Registers", are used to communicate information which specifies either memory or I/O address space requirements for the corresponding functions during configuration. (Also known as BARs, Base Address Registers store the size of a function's address space and allow the system to allocate the starting address at which that function's required address space begins.) This information is used by configuration software to initialize the device with non-conflicting resources.

As can be seen in FIG. 1, the PCI Device Header Type Region includes Base Address Registers (BARs) in locations 10h through 24h. The first BAR location is 10h. Depending upon the word length of this first BAR, the second BAR may be located at either 14h or 18h. The offset location of any BAR other than the first depends on the size of the previous BARs.

In each of the up to six base address registers, bit 0 is an address space type indicator which is a ZERO for allocating memory, and a ONE for allocating I/O space.

The definition for base address bits for allocating memory is shown in FIG. 2. When bit 0 is ZERO (indicating that memory is to be allocated), bits 1 and 2 specify the memory type and bit 3 denotes whether or not the device's memory space is prefetchable. Bits 4 to 31 indicate the size of a memory space region assigned to the device. This is implemented by setting to the value of ONE that bit representing the size in powers of 2 of the block of memory space requested by that device. For example, if a device is set to request a 64 kilobyte block of memory (216 bytes), then bit 15 (the 16th bit) will be the first bit above bit 3 set to ONE, with all bits between bit 3 and bit 15 being set to ZERO.

Because these Base Address Registers are reset upon power-up, any bit set to ONE must be hard-wired (stored by non-volatile means).

SUMMARY OF THE INVENTION

In a preferred embodiment of the invention, bits in the PCI configuration space header that are intended for configuration use (except for hardwired bits or bits used for other PCI control functions after configuration) may be reused after configuration is complete. Configuration normally occurs only after a system reset, such as after initially powering up a system, so that Base Address values (for example) assigned during configuration do not change during the course of a systems operation. Thus, in the case of all read-only registers, the BARs and addresses indicating unimplemented functions can be completely reused in alternative operations such as write operations without adversely affecting normal PCI configuration operations. Even in the BARs that were used during configuration, those bits not hardwired can be reused. In a BAR used for indicating memory size, those bit locations starting at bit location 4 and going upward to that bit location immediately below the bit hardwired to a value of ONE can be reused. Bits above this hardwired bit can be reused as well. In a BAR used for indicating I/O size, only bits 0 and 1 and one bit for indicating size are non-volatile, thus all remaining bits in the Base Address Register used for indicating I/O size may also be reused. Other portions of the configuration space header region may also be reused. However, the Command register (location 04h) may not be reused.

The present invention makes use of volatile bit locations in the configuration space header after configuration is complete without interfering with the normal PCI local bus operation or configuration. These volatile bit locations can be used for data storage as a user-defined register such as a mailbox register, for a general purpose control register, for flag-type storage, or for control of various applications. As used herein the term "mailbox register" refers to a register of one or more bits and which provides a unidirectional or bidirectional data path that can be used to send data or control information between a PCI or other local bus and a PCI or other local bus device and thus serves as a customizable command, status, and parametric data register. Use of mailbox registers is determined by user software. Mailbox registers may be used to initiate larger data transfers and initiate interrupts.

These reused register bits may be accessed from the PCI side of the bus via a normal configuration read or a normal configuration write cycle.

The preferred mode of the present invention is used with a PCI local bus. However, the invention can also be applied to other local buses, including those not yet defined.

This novel method of using unused space in the configuration space header in PCI local bus devices has a number of benefits. First, it makes use of otherwise unused bit locations in a configuration space header which has been provided to comply with the PCI specification. Second, there is no need for additional circuitry to decode the user-defined registers. Third, the invention provides a dual use for the PCI device base address register. Fourth, an implementation of the invention does not require an entire register, such as a base address register, for one function. (However, one could use an entire base address register alone to decode a single user-defined register.) Thus, the present invention, in effect, comprises a method for exploiting an under-used address space and the existing decode resource in PCI or other local bus compatible devices.

DETAILED DESCRIPTION OF A PREFERRED EMBODIMENT

Figure 1:
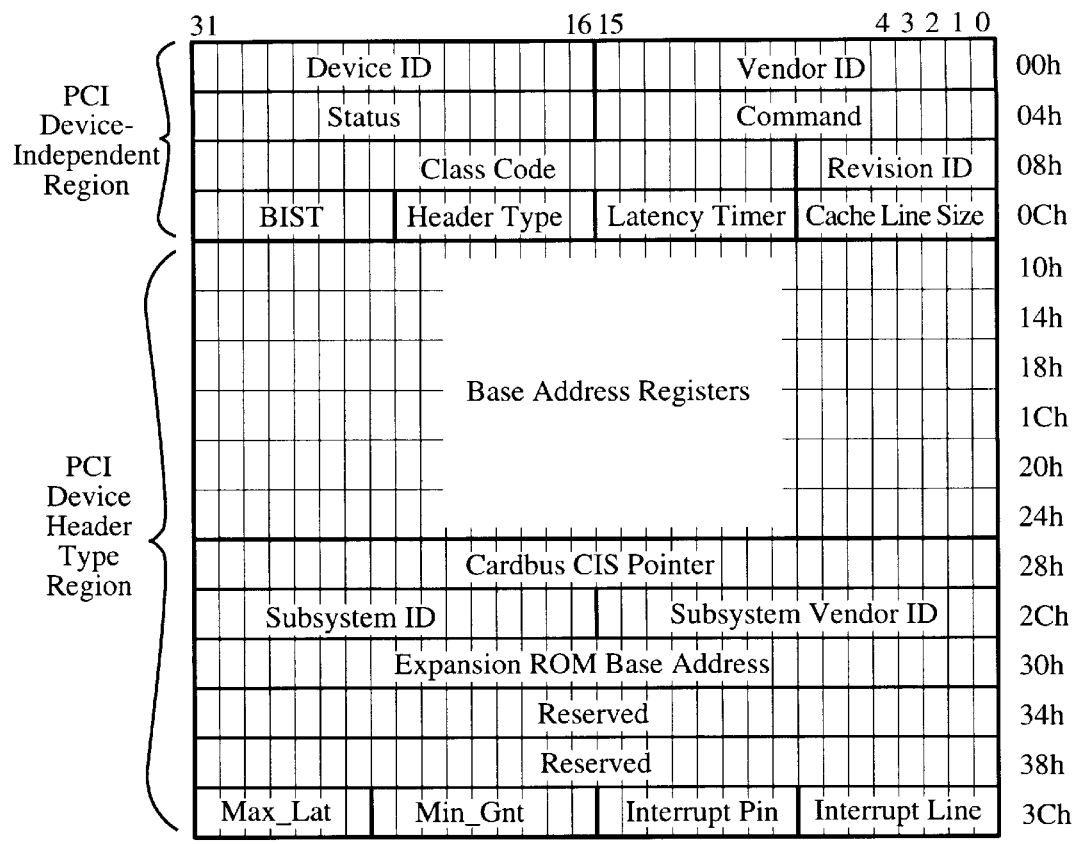
FIG. 1 is a pictorial view of the 64 byte register layout of a type 00h PCI configuration space header.
Figure 2:
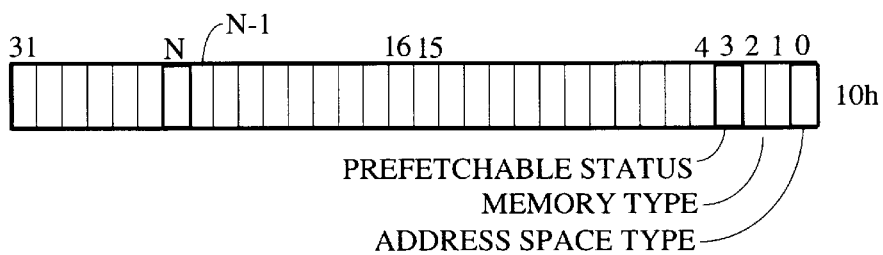
FIG. 2 is a bit location layout diagram of a Memory Base Address Register of a PCI local bus device.
Figure 3:
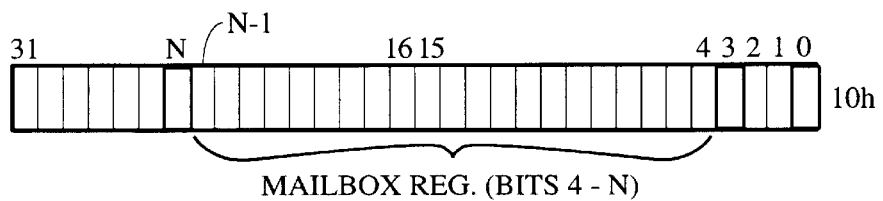
FIG. 3 is a bit location layout diagram of a Memory Base Address Register of a PCI local bus device being used as a mailbox or control register in accordance with the present invention.

The preferred embodiment of the present invention relies upon the PCI requirement that PCI local bus compatible devices must have the configuration space header shown in FIG. 1 for all PCI devices except PCI to PCI Bridges. The PCI standard does not contemplate that certain portions of the configuration space header (such as the BARs) will again be used after configuration is complete. Irrespective of which type of PCI device is employed, there are standard registers in the configuration space header region, most notably the base address registers beginning at offset 10h.

The present invention, in a preferred embodiment, comprises the following steps:

a) providing a PCI device having volatile register bits not used for further system configuration operations after system configuration;

b) before completing the manufacture of the device, determining the memory space required by the device for operation in a PCI local bus;

c) permanently setting to logic ONE that bit in location N, where N is the power of 2 indicating the memory space required by the device;

d) implementing at least bit 4 through bit N-1 (Memory BAR) or at least bit 2 through bit N-1 (I/O BAR) of said base address register as a user-defined register.

When the device is placed into a system, bits in the Command register will cause the I/O and memory devices in the system to be allocated space according to the sizes stored by the non-volatile bit in the Base Address Registers. After configuration is complete, the Command register can return control of parts of the configuration space header to the user. Read access to bit 4 through bit N-1 is controlled from bit 0 or bit 1 in the Command register (see FIG. 1). These bits are the I/O and memory space enable bits, respectively. Mailbox register bits are not loaded until configuration is complete. Immediately after a system reset and also during a PCI Configuration Manager read access to the BAR, bits 4 through N-1 (Memory BAR) or bits 2 through N-1 (I/O BAR) must return a data value of zero in order to ensure that the proper memory or I/O size is configured. After completion of configuration, for each BAR identified by the relevant Command register enable bit being enabled (by writing to it the logical value '1'), the use and significance of bits 4 through N-1 become user-defined. (The term "user-defined" is used herein to indicate that these bits may be written with arbitrary values and may also return arbitrary values determined by a designer wishing to use them for some arbitrary communication or control purpose.) Access to these register bits is through normal PCI Configuration Read and PCI Configuration Write cycles. Since these user-defined bits are not loaded during configuration, and will be erased if the system is reset, the PCI system configuration is not affected in the process. A Configuration Write after configuration to bits 4 through N-1 of an active BAR register does nothing to affect PCI device configuration.

While the above description focused on Base Address Register use for user-defined functions, a user Configuration Write cycle to any user-controlled configuration space header register (any register illustrated in FIG. 1) does nothing to affect actual PCI Device Configuration. However, a write to the Command register may disable or enable user access to a related part of the Configuration Space Header. Therefore, the Command register may not be used as freely by the system user and is preferably not used for user-defined registers. Other register addresses may be used at any time as arbitrary user-defined 'write only' registers. Likewise, after PCI system configuration is completed these other registers may be used as arbitrary user-defined 'read-write' registers. This means, for example, that all unused BARs may easily be used for write mailbox registers requiring a minimum of support circuitry for this additional functionality.

Furthermore, the whole or part of the configuration space header may easily be paged to provide more addressable register space by use of an otherwise redundant register bit. Indeed, paging may be extended using more redundant bits. For example, four pages may be provided using two bits, etc. (Paging is a well-known technique for memory addressing. A description of address space paging is given by Andrew S. Tanenbaum, on pages 324–327 of "Structured Computer Organization, Third Edition", published in 1990 by Prentice-Hall International, Inc., which are incorporated herein by reference.) The implementation of address space paging is well known to those skilled in the art of logic design.

It is important to avoid possible side effects associated with the invention. The following guidelines assist in avoiding such side effects:

1. Overwriting previously valid register data. A data mask must be used when writing to the Command register to ensure that writes to command bits that the user intends to change do not also change other bits in the Command register, thereby adversely affecting the values of other bits in the Command register. The term and construction of a 'mask' as used here is commonly understood in the software industry as meaning that writing new data values to individual bits in a register is achieved by a process involving a read cycle to copy all bits from the Command register to another register, a write cycle to write to selected bits in the copy, and a write cycle to copy the altered set of all bits back to the Command register. Since the original values remain in the Command register while this copying and writing is taking place, any bits of the Command register which are not altered in the copy retain a steady-state value when the new altered set of bits is written back to the Command register. Only those bits which the user intends to change receive the new data.

2. User access of configuration space header register bits prior to PCI System Configuration. The person who writes the configuration routines must ensure that access of user-defined bits in the configuration space header conforms to requirements of the PCI specification until after configuration.

3. Paging the configuration space header. It is preferable to page only the Device Dependent Region in the configuration space header, leaving the Device Independent Region to be accessed as originally defined in version 2.1 of the PCI specification.

4. Misinterpreting the meaning of bits in the Command register. Even though the PCI specification indicates that a value of 0 in bit location 0 or 1 in the Command register disables the device response, some chip designers use a value of logic ONE to disable a function. This affects the system's initial behavior on power-up. Thus the chip designer, in order to design a PCI compliant chip, must ensure that bits 0 and 1 in the Command Register cause all bits which need to power-up to ZERO actually to power up to ZERO.

Those having skill in the relevant arts will now, as a result of the Applicant's disclosure herein, perceive various additions and modifications which may be made to the illustrative embodiment shown. By way of example, a user-defined register implementation in accordance with the present invention may use fewer than the number of available bit locations in a base address register. Furthermore, one may readily set the bit location for memory space at a higher or more significant point in the base address register than actually needed so that a larger number of bit locations are available for user-defined register implementation. Accordingly, all such additions and modifications are deemed to be within the scope of the invention, which is to be limited only by the appended claims and their equivalents.

What is claimed is:

1. A method of providing registers in a PCI device comprising the steps of:
   a) configuring a system in which the PCI device is located according to configuration information provided by a configuration space header in said PCI device;
   b) configuring said configuration space header to be rewritten by a user;
   c) loading user information into at least one register of said configuration space header; and
   d) resetting the system, thereby erasing said user information and reconfiguring said system according to said configuration information of step a).

2. The method of claim 1 wherein said one register is a base address register.

3. The method of claim 2 wherein said user information is a user-defined register address.

4. The method of claim 2 wherein said user information is a control register.

5. The method of claim 2 wherein said user information is at least one flag.

6. A method of providing registers in a local bus device, the method comprising the following steps:
   a) providing a local bus device having at least one configuration space register, said configuration space resister having a reset value representing an address space required by the device for operation in the local bus;
   b) setting a location bit of said one register to a non-volatile value to indicate the size of said address space;
   c) implementing bits of said one register otherwise unused after configuration as a user-defined register; and
   d) resetting said local bus device, thereby erasing information stored in said user-defined register and restoring said reset value of said configuration space register.

7. The method of claim 6 wherein said one register is a base address register.

8. The method of claim 7 wherein said local bus device is a PCI local bus device and said local bus is a PCI bus, and wherein said location bit is above bit 1 of said base address register.

9. The method recited in claim 7 wherein said user-defined register comprises at least bit 4 through bit N-1 of said base address register, where bit N is said location bit.

10. The method recited in claim 7 wherein said base address register is an M-bit register and wherein said location bit is among the most significant M-1 bits of said base address register, where M is an integer at least equal to 8.

11. The method recited in claim 6 wherein said configuration space register may be paged by use of one or more control bits implemented in said configuration space register.

12. The method recited in claim 6 wherein said configuration space register may be partially paged by use of one or more control bits implemented in said configuration space register.

13. The method recited in claim 6 wherein said configuration space register is used as a read/write-able register after configuration.

14. The method of claim 6 wherein said location bit corresponds to a 32-bit address which at least equals the memory space required by said local bus device.

15. The method recited in claim 6 wherein in said implementing step said user-defined register is configured for bidirectional data flow.

16. The method recited in claim 6 wherein in said implementing step said user-defined register is configured for unidirectional data flow.

17. A computer peripheral device configured for connection to a PCI local bus, the computer peripheral device comprising:
   a base address register having:
      at least one bit location configured to present a logic ONE; and
      a plurality of modifiable bit locations configured to present, during said system configuration, a plurality of logic ZERO's; and usable as a user-defined register after said system configuration is complete, wherein said logic ONE and said plurality of logic ZERO's, in combination, represent a memory space required by the peripheral device; and a resetting circuit for resetting said plurality of modifiable bit locations to a known value when said resetting circuit receives a reset signal for the peripheral device.

18. The device recited in claim 17 wherein said user-defined register comprises a contiguous plurality of bit locations.

19. The device recited in claim 18 wherein said contiguous plurality of bit locations include a most significant bit location adjacent to said logic ONE bit location.

20. The device recited in claim 17 wherein at least some of said user-defined register bit locations are configured for read operations.

21. The device recited in claim 17 wherein at least some of said user-defined register bit locations are configured for write operations.

* * * * *